(12) United States Patent
Lee et al.

(10) Patent No.: US 7,619,044 B2
(45) Date of Patent: Nov. 17, 2009

(54) COMPOSITION CONTAINING PROTON-CONDUCTIVE COPOLYMER, POLYMER ELECTROLYTE MEMBRANE, METHOD OF PRODUCING THE MEMBRANE, AND FUEL CELL USING THE MEMBRANE

(75) Inventors: Won-mok Lee, Seoul (KR); Hae-kyoung Kim, Seoul (KR); Tae-kyoung Kim, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 11/857,063

(22) Filed: Sep. 18, 2007

(65) Prior Publication Data
US 2008/0157422 A1    Jul. 3, 2008

(30) Foreign Application Priority Data
Dec. 29, 2006    (KR) ............... 10-2006-0138865

(51) Int. Cl.
*C08L 83/10* (2006.01)
(52) U.S. Cl. ............... 525/477; 528/31; 528/32

(58) Field of Classification Search ............ 525/477; 528/31, 32
See application file for complete search history.

(56) References Cited

U.S. PATENT DOCUMENTS

2006/0148985 A1* 7/2006 Karthauser ............ 525/100

FOREIGN PATENT DOCUMENTS

KR    10-0659130    12/2006

* cited by examiner

*Primary Examiner*—Kuo-Liang Peng
(74) *Attorney, Agent, or Firm*—Stein McEwen, LLP (57) ABSTRACT

A composition containing a proton-conductive copolymer, a polymer electrolyte membrane containing the composition; a method of producing the membrane; and a fuel cell employing the membrane. The composition includes: a proton-conductive copolymer comprising a first styrene repeating unit, a second styrene repeating unit, and a dimethylsiloxane repeating unit; and a cross-linked polymer obtained from a cross-linking reaction between a siloxane oligomer having an unsaturated bond and a cross-linking agent. The cross-linked polymer has the same properties as the dimethylsiloxane repeating unit of the proton-conductive copolymer.

20 Claims, 4 Drawing Sheets

COMPOSITION CONTAINING PROTON-CONDUCTIVE COPOLYMER, POLYMER ELECTROLYTE MEMBRANE, METHOD OF PRODUCING THE MEMBRANE, AND FUEL CELL USING THE MEMBRANE

CROSS-REFERENCE TO RELATED APPLICATION

This application claims the benefit of Korean Application No. 2006-138865, filed Dec. 29, 2006, in the Korean Intellectual Property Office, the disclosure of which is incorporated herein by reference.

BACKGROUND OF THE INVENTION

1. Field of the Invention

Aspects of the present invention relate to a composition containing a proton-conductive copolymer, a polymer electrolyte membrane formed from the composition, a method of producing the membrane, and a fuel cell using the membrane.

2. Description of the Related Art

Fuel cells can be classified, according to the type of electrolyte used, as polymer electrolyte membrane fuel cells (PEMFC), phosphoric acid fuel cells (PAFC), molten carbonate fuel cells (MCFC), solid oxide fuel cells (SOFC), and the like. The operating temperature of the fuel cell and the material used in the constituent elements will vary, according to the electrolyte used.

Fuel cells can also be classified according to a method of supplying fuel to the anode. Thus, fuel cells can be divided into an external reforming type, in which fuel is converted to hydrogen-enriched gas by a fuel reformer and then supplied to an anode, and a direct fuel feeding type, or an internal reforming type, in which fuel is supplied directly to an anode in a gaseous or liquid state.

A representative example of a direct fuel feeding fuel cell is a direct methanol fuel cell (DMFC). In general, the direct methanol fuel cell uses an aqueous solution of methanol as fuel, and a proton-conductive, polymer electrolyte membrane as an electrolyte. In this light, a DMFC is a type of PEMFC.

A PEMFC can provide a high output density while having a small size and light weight. Moreover, a PEMFC can lead to a simplified configuration for a power generating system. A PEMFC typically comprises an anode (fuel electrode), a cathode (oxidant electrode), and a polymer electrolyte membrane disposed between the anode and the cathode. The anode of the PEMFC includes a catalyst layer to promote oxidation of fuel, and the cathode of the PEMFC includes a catalyst layer to promote reduction of an oxidant.

The fuel that is supplied to the anode of a PEMFC is typically hydrogen, a hydrogen-containing gas, a vapor mixture of steam and methanol, an aqueous solution methanol, or the like. The oxidant that is supplied to the cathode of a PEMFC is typically oxygen, an oxygen-containing gas, or air.

At the anode of the PEMFC, fuel is oxidized to generate protons and electrons. The generated protons are transferred to the cathode through the electrolyte membrane, and the electrons are transferred to an external circuit (load) through a conducting wire (or a collector). Then, the protons are transferred through the electrolyte membrane to the cathode of the PEMFC, the electrons are transferred from the external circuit through the conducting wire (or a collector), and combined with oxygen to form water. Here, the flow of electrons passing through the anode, the external circuit, and the cathode is referred to as electricity or electric current.

In the PEMFC, the polymer electrolyte membrane serves not only as an ion conductor for the transfer of protons from the anode to the cathode, but also as a separator to block mechanical contact of the anode and the cathode. Thus, the properties required from a polymer electrolyte membrane include excellent ion conductivity, electrochemical stability, high mechanical strength, thermal stability at operating temperatures, and the ability to be easily formed into a thin film.

The material generally used for forming a polymer electrolyte membrane is exemplified by a polymer electrolyte, such as, a sulfonate perfluorinated polymer (e.g., NAFION of DuPont Corporation) having a backbone composed of fluorinate alkylenes and side chains composed of fluorinated vinyl ether with sulfonic acid groups at the ends of the chains. Such polymer electrolyte membrane holds an adequate amount of water, thus exhibiting excellent ion conductivity.

However, such a polymer electrolyte membrane does not have a satisfactory methanol permeability, and is costly to produce. Furthermore, when the operating temperature is above 100° C., the ion conductivity is severely degraded due to the evaporation of water from the membrane, and the electrolytic function of the membrane is impaired. It is therefore virtually impossible to operate a PEMFC employing such a polymer electrolyte membrane at normal pressure and at a temperature exceeding 100° C. Thus, conventional PEMFCs have been operated mainly at a temperature of not higher than 100° C., for example, but not limited thereto, about 80° C.

Furthermore, in general, when the ion conductivity of an electrolyte membrane is increased, the water permeability thereof is also increased. This property is usually associated with an increase in the methanol permeability. Thus, it is difficult to for an electrolyte membrane to simultaneously have a high ion conductivity and a low methanol permeability. When a comparison is made between the amounts of water and methanol that have passed through a potential electrolyte membrane, and the amounts of water and methanol that pass through a standard electrolyte membrane (e.g., NAFION 115), the potential electrolyte membrane may be determined to be useful as a DMFC electrolyte membrane, if the comparison ratio for the amount of passed water is greater than or equal to 1, while the comparison ratio for the amount of passed methanol is less than 1.

Extensive research is being conducted to create a polymer electrolyte membrane which can overcome the aforementioned problems, and can be used as a substitute for a NAFION electrolyte membrane. As the material forming such polymer electrolyte membrane, there is known a block copolymer comprising a hydrocarbon-based repeating unit, such as, a styrene repeating unit, an ethylene-r-butylene repeating unit, or an isobutylene repeating unit.

However, such block copolymers have problems in that the methanol crossover and swelling of the block copolymers are so extensive that the dimensional stability of a membrane-electrolyte assembly (MEA) formed therewith, is very poor.

Thus, the present invention seeks to address at least the problems of conventional polymer electrolyte membranes as described above.

SUMMARY OF THE INVENTION

Aspects of the present invention provide a composition containing a proton-conductive copolymer, which is chemically and mechanically stable, has a low degree of methanol crossover, and has excellent mechanical strength. Aspects of the present invention also provide a polymer electrolyte membrane comprising the composition containing a proton-conductive copolymer, which has an improved ion conductivity, chemical stability, and mechanical stability.

Aspects of the present invention also provide a method of producing the polymer electrolyte membrane, and a fuel cell using the polymer electrolyte membrane, which has improved performance, such as improved polymer efficiency.

According to an aspects of the present invention, there is provided a composition containing a proton-conductive copolymer, the composition comprising a proton-conductive copolymer containing a repeating unit represented by the following Formula (1), a repeating unit represented by the following Formula (2), and a repeating unit represented by the following Formula (3); and a cross-linked polymer resulting from a cross-linking reaction between a siloxane oligomer having an unsaturated bond and a cross-linking agent:

[Formula 1]

wherein $R_1$ and $R_2$ each independently represent hydrogen, a halogen atom, or a halogenated $C_1$-$C_{10}$ alkyl group; and p represents a molar amount ranging from about 0.1 to 0.9;

[Formula 2]

wherein $R_3$ and $R_4$ each independently represent hydrogen, a halogen atom, or a halogenated $C_1$-$C_{10}$ alkyl group; $R_5$ represents —$SO_3H$, —$PO_3H$ or —$CO_2H$; and q represents a molar amount ranging from about 0.1 to 0.9;

[Formula 3]

wherein $R_6$ represents a $C_1$-$C_{10}$ alkyl group; and r represents a molar amount ranging from about 0.1 to 0.9.

According to aspects of the present invention, there is provided a polymer electrolyte membrane comprising the composition containing a proton-conductive copolymer. According to other aspects of the present invention, there is provided a method of producing the polymer electrolyte membrane, the method comprising: dissolving a proton-conductive copolymer containing a repeating unit represented by Formula (1), a repeating unit represented by the Formula (2), and a repeating unit represented by Formula (3), a siloxane oligomer having an unsaturated bond, and a cross-linking agent in a solvent; forming a film using the resulting solution; and heating the film to induce a cross-linking reaction between the siloxane oligomer having an unsaturated bond and the cross-linking agent:

According to an exemplary embodiment of the present invention, the heating may be conducted at about 30 to 200° C., and the siloxane oligomer having an unsaturated bond may be used in an amount of about 1 to 50 parts by weight, based on 100 parts by weight of the proton-conductive copolymer. The cross-linking agent may be used in an amount of about 1 to 50 parts by weight, based on 100 parts by weight of the proton-conductive copolymer.

According to another aspect of the present invention, there is provided a fuel cell using the polymer electrolyte membrane.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the exemplary embodiments of the present invention, examples of which are illustrated in the accompanying drawings, wherein like reference numerals refer to the like elements throughout. The embodiments are described below in order to explain the present invention by referring to the figures. The invention may, however, be embodied in many different forms and should not be construed as being limited to the exemplary embodiments set forth herein; rather, these embodiments are provided so that this disclosure will be thorough and complete, and will fully convey the concept of the invention to those skilled in the art.

A composition containing a proton-conductive copolymer, according to exemplary embodiments of the present invention, comprises a proton-conductive copolymer, and a cross-linked polymer obtained from a cross-linking reaction between a siloxane oligomer having an unsaturated bond and a cross-linking agent. The proton-conductive copolymer may contain three different repeating units, namely, a first styrene repeating unit represented by the following Formula (1), a second styrene repeating unit represented by the following

Formula (2), which has excellent ion conductivity due to the presence of a proton conducting group, and a dimethylsiloxane repeating unit represented by the following Formula (3), which has excellent chemical and mechanical properties:

[Formula 1]

wherein $R_1$ and $R_2$ each independently represent hydrogen, a halogen atom, or a halogenated $C_1$-$C_{10}$ alkyl group; and p represents a molar amount ranging from about 0.1 to 0.9;

[Formula 2]

wherein $R_3$ and $R_4$ each independently represent hydrogen, a halogen atom, or a halogenated $C_1$-$C_{10}$ alkyl group; $R_5$ represents —$SO_3H$, —$PO_3H$ or —$CO_2H$; and q represents a molar amount ranging from about 0.1 to 0.9;

[Formula 3]

wherein $R_6$ represents a $C_1$-$C_{10}$ alkyl group; and r represents a molar amount ranging from about 0.1 to 0.9.

The degree of polymerization of the proton-conductive copolymer may be from about 1 to 100,000, and the weight average molecular weight of the proton-conductive copolymer may be from about 500 to 5,000,000.

According to an exemplary embodiment of the present invention, the proton-conductive copolymer may be a block copolymer, and the polymer chain segments, respectively including the first styrene repeating unit, the second styrene repeating unit and the dimethylsiloxane repeating unit, may be connected to one another to form a nanostructure. The nanostructure may vary in morphology and size in accordance with the proportions and molecular weights of the repeating units. Examples of such nanostructure include a cylindrical structure, a layered structure, and the like. The first styrene repeating unit and the second styrene repeating unit form a hydrophilic region that is a proton path. The dimethylsiloxane repeating unit forms a hydrophobic region contributing to the mechanical properties.

More detailed description on polymer electrolyte membranes comprising a proton-conductive copolymer can be found in Korean Patent Application No. 2005-0135841, which is incorporated herein, by reference.

The proton-conductive copolymer contains styrene repeating units which are hydrophilic blocks, and a dimethylsiloxane repeating unit which is a hydrophobic block. A polymer electrolyte membrane, formed using the proton-conductive copolymer, exhibits a low methanol permeability and a high ion conductivity. The permeability and conductivity can be a result of a nanostructure of the polymer electrolyte membrane.

According to another exemplary embodiment of the present invention, there is provided a composition containing a proton-conductive copolymer. The composition has an excellent methanol permeability and ion conductivity. The composition has improved mechanical properties as compared to the proto-conductive copolymer alone.

According to the exemplary embodiment, in order to further improve the mechanical properties of the hydrophobic block of the proton-conductive copolymer, while maintaining the hydrophilic nanostructure of the same, which forms a proton path, a composition to form a cross-linked polymer, is provided. The composition is formed from a mixture of a cross-linkable, hydrophobic oligomer, a cross-linking agent, and the proton-conductive copolymer. The hydrophobic oligomer can be, for example, a siloxane oligomer capable of forming a cross-linked polymer, which has the same chemical properties, that is, the same repeating structure, as the hydrophobic block A film is formed using the resulting mixture, and a cross-linking reaction is allowed to proceed to form a cross-linked polymer.

Figure 1:
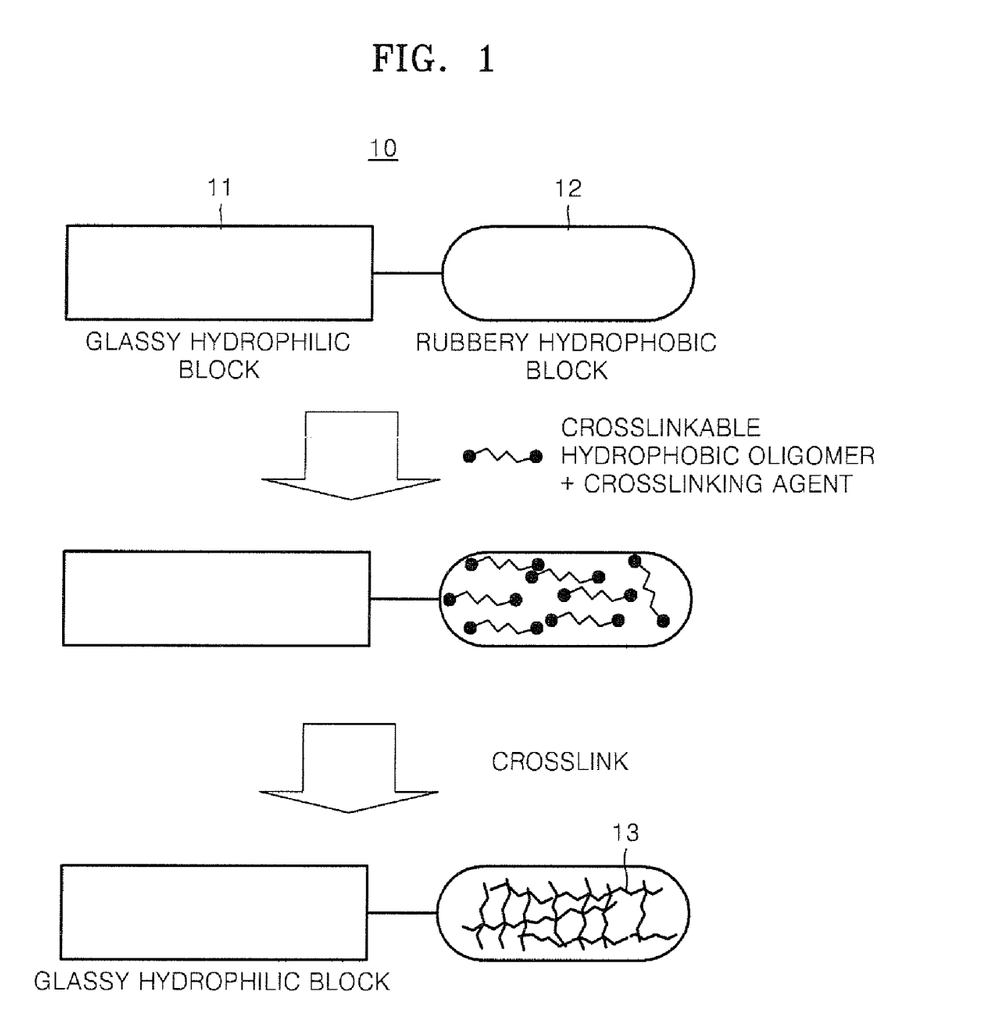
FIG. 1 is a diagram schematically illustrating a method of mixing a composition for forming a cross-linked polymer, and performing a cross-linking reaction, to improve mechanical properties of a polymer electrolytic membrane, according to an exemplary embodiment of the present invention.

FIG. 1 is a diagram schematically illustrating the processes of mixing the composition, and forming a cross-linked polymer as an electrolyte membrane having improved mechanical properties, according to an exemplary embodiment of the present invention.

Referring to FIG. 1, a proton-conductive copolymer 10, which comprises a hydrophilic block 11 and a hydrophobic block 12, is mixed with a hydrophobic, cross-linkable oligomer and a cross-linking agent, to form a composition for forming a cross-linked polymer. The hydrophobic, cross-linkable oligomer comprises a siloxane oligomer having an unsaturated bond and has the same chemical properties, that is, the same repeating structure, as those of the hydrophobic block 12. The cross-linking agent has a hydride group.

Upon mixing, the siloxane oligomer, which has chemical properties that are different from those of the hydrophilic block 11, intercalates with the hydrophobic block 12, which has the same repeating structure. A cross-linking reaction is then performed, to form a cross-linked polymer. The cross-linked polymer is a product of the cross-linking reaction between the siloxane oligomer and the cross-linking agent, and thus, a structure in which the cross-linked polymer is merely physically entangled with the hydrophobic blocks 12 of the proton-conductive copolymer (block copolymer) 10, without any chemical bonding, will be formed.

As such, a polymer electrolyte membrane, according to exemplary embodiments of the present invention, is formed, which comprises the cross-linked polymer. Thus, the polymer electrolyte membrane attains improved mechanical properties, while still maintaining the excellent ion conductivity and methanol permeability properties of a polymer electrolyte membrane formed of a block copolymer.

As a specific example of the proton-conductive copolymer, is a copolymer represented by Formula (4) below:

[Formula 4]

wherein p, q and r each independently represent a molar amount ranging from about 0.1 to 0.9; and n is a number from 1 to 100,000.

The siloxane oligomer is a monomer, which is polymerizable by cross-linking, is capable of forming a cross-linked polymer, and can have generally the same structure as the dimethylsiloxane repeating unit of the proton-conductive copolymer. The siloxane oligomer has an unsaturated bond, and may have a weight average molecular weight of from about 200 to 50,000.

The siloxane oligomer, according to the exemplary embodiment of the present invention, is represented by the following Formula (6):

[Formula 6]

wherein $R_7$ and $R_8$ each independently represent a $C_1$-$C_{20}$ alkyl group, a $C_1$-$C_{20}$ alkoxy group, or a halogen atom; at least one of $R_9$ and $R_{10}$ represents a vinyl group, a $C_3$-$C_{20}$ vinylalkyl group, or a $C_7$-$C_{20}$ vinylaryl group, while the other represents a $C_1$-$C_{20}$ alkyl group, a $C_1$-$C_{20}$ alkoxy group, or a halogen atom; and m is a number from 1 to 1000.

For the Formula (6), examples of the $C_3$-$C_{20}$ vinylalkyl group include —$CH_2CH=CH_2$, —$CH_2CH_2CH=CH_2$, and the like, and examples of the $C_7$-$C_{20}$ vinylaryl group include —$C_6H_4CH=CH_2$, and the like.

Specific examples of the siloxane oligomer represented by the Formula (6) above include compounds represented by the following Formulas (7), (8), and (9):

[Formula 7]

wherein m is a number from 1 to 1000;

[Formula 8]

wherein m is a number from 1 to 1000; and

[Formula 9]

wherein m is a number from 1 to 1000.

The cross-linking agent that is used, according to an exemplary embodiment of the present invention, has a hydride group, and forms a cross-linked polymer having the same repeating unit as the dimethylsiloxane repeating unit, which constitutes the proton-conductive copolymer, through the cross-linking reaction with the siloxane oligomer as described above.

The cross-linking agent may be represented by the following Formula (10):

[Formula 10]

wherein $R_{11}$, $R_{12}$, $R_{13}$ and $R_{14}$ each independently represent a $C_1$-$C_{20}$ alkyl group, a $C_1$-$C_{20}$ alkoxy group, or a halogen atom; k is a number from 1 to 1000; and t is a number from 1 to 1000.

Specific examples of the compound of the Formula (10) include a compound represented by the following Formula (11):

[Formula 11]

wherein k is a number ranging from 1 to 1000; and t is a number ranging from 1 to 1000.

The reaction to form a cross-linked polymer, as a result of a cross-linking reaction between a siloxane oligomer and a cross-linking agent, according to an exemplary embodiment of the present invention, may be described as shown in Reaction Scheme (1) below:

[Reaction Scheme 1]

Siloxane Oligomer

Crosslinking Agent

Hereinafter, a method of producing a proton-conductive copolymer, according to an exemplary embodiment of the present invention, will be described, and the method of producing the proton-conductive copolymer of Formula (4), will be taken as an example.

First, a copolymer represented by the following Formula (5), comprising the first styrene repeating unit of Formula (1) and the dimethylsiloxane repeating unit of Formula (3) is mixed with a solvent, and this mixture is refluxed, to uniformly disperse the copolymer within the solvent. Then, a sulfonation reaction is performed to obtain the proton-conductive copolymer of Formula (4).

[Formula 5]

wherein m and r each independently represent a molar amount ranging from about 0.1 to 0.9; and n is a number from 1 to 100,000.

The reaction conditions of the sulfonation reaction are not particularly limited, but according to an exemplary embodiment of the present invention, the sulfonation reaction is performed at 30 to 100° C., using acetyl sulfate that is obtained from a mixture of acetic anhydride and sulfuric acid. If the temperature for the sulfonation reaction is below 30° C., the reaction may not be achieved sufficiently. If the temperature is above 100° C., thermal decomposition of the reactant polymer may be undesirably accelerated. When acetyl sulfate is used as the sulfonating agent, a generally uniformly sulfonated copolymer can be obtained, and it is easy to control a particular degree of sulfonation.

The amount of the sulfuric acid that can be used may be from about 0.1 to 3 moles, based on 1 mole of the first styrene repeating unit of the copolymer, and the amount of the acetic anhydride may be about 1 to 10 moles, based on 1 mole of sulfuric acid.

The solvent may be exemplified by dichloroethane, dichloromethane, trichloroethane, or the like. The amount of the solvent to be used may be about 100 to 50,000 parts by weight, based on 100 parts by weight of the copolymer of Formula (5), which comprises the first styrene repeating unit of Formula (1) and the dimethylsiloxane repeating unit. If the solvent is used in an amount that is not within the range described above, the copolymer of the Formula (5) may not be uniformly dispersed, or the reactants may be diluted in the solvent, so that the reactivity of the sulfonation reaction is decreased.

Alcohol is used to terminate the sulfonation reaction. The alcohol terminates the sulfonation reaction by reacting with an excess of acetyl sulfate. Examples of the alcohol include 2-propanol, methanol, ethanol, 1-butanol, and the like. The amount of the alcohol used may be about 1 to 10 moles, based on 1 mole of sulfuric acid.

After the sulfonation reaction, the solvent is removed from the reaction mixture, by evaporation under reduced pressure. The product obtained therefrom is washed with a solvent, such as, water or methanol. Then, the desired copolymer is obtained.

According to an exemplary embodiment of the present invention, by using acetyl sulfate as the sulfonating agent, as described above, a generally uniformly sulfonated copolymer can be obtained, and it is easy to control the degree of sulfonation. Thus, a polymer electrolyte membrane formed of the copolymer attains excellent ion conductivity and methanol crossover properties.

The proton-conductive copolymer thus obtained, contains a dimethylsiloxane repeating unit, and thus, has excellent film formability and methanol permeability. The proton-conductive copolymer can be used in the formation of a polymer electrolyte membrane for a fuel cell. The method of producing such a polymer electrolyte membrane is not particularly limited. An exemplary method of producing the polymer electrolyte membrane is as follows.

The proton-conductive copolymer obtained as described above is dissolved in a first solvent to yield a solution A. Examples of the first solvent include tetrahydrofuran, 1,4-dioxane, dimethylsulfoxide, dimethylacetamide, and mixtures thereof. The amount of the first solvent may be about 100 to 5000 parts by weight, based on 100 parts by weight of the proton-conductive copolymer.

The siloxane oligomer and the cross-linking agent are dissolved in a second solvent, to yield a solution B. Examples of the second solvent include tetrahydrofuran, 1,4-dioxane, dimethylsulfoxide, N,N-dimethylactamide, and mixtures thereof. The amount of the second solvent that can be about 100 to 5000 parts by weight, based on 100 parts by weight of the siloxane oligomer.

The solution A and the solution B are mixed, to obtain a composition for forming a polymer electrolyte membrane. The mixing ratio, by weight of the siloxane oligomer and the cross-linking agent, is adjusted such that an amount of the siloxane oligomer that is contained in the mixture of the solution A and the solution B is about 1 to 50 parts by weight, based on 100 parts by weight of the proton-conductive copolymer. The amount of the cross-linking agent that is contained in the mixture is about 1 to 50 parts by weight, based on 100 parts by weight of the proton-conductive copolymer.

The composition for forming the polymer electrolyte membrane is applied to a support and dried to form a film. The film is peeled off from the support. Here, the support can be a glass substrate, a polytetrafluoroethylene film, a polyethylene terephthalate (PET) plate, a metal plate, or the like, which has a smooth and uniform surface.

The drying may be performed at a temperature of about 0 to 200° C., for 1 to 24 hours, in an inert gas atmosphere.

The film is heated to induce a cross-linking reaction between the siloxane oligomer and the cross-linking agent, to form a polymer electrolyte membrane comprising a proton-conductive copolymer and a cross-linked polymer.

The heating, to induce the cross-linking reaction, may be performed at a temperature of about 30 to 200° C. If the temperature for the heating is below about 30° C., the cross-linking reaction may not be achieved sufficiently. If the temperature exceeds about 200° C., the polymer electrolyte membrane may undergo undesirable thermal decomposition. A time for the heating may vary, in accordance with the heating temperature, but typically ranges from about 1 to 48 hours.

The cross-linking reaction may use a catalyst to promote the cross-linking reactivity. Examples the catalyst include platinum catalysts, non-platinum catalysts, and the like.

The amount of the cross-linked polymer contained in the polymer electrolyte membrane may be about 1 to 50 parts by weight, based on 100 parts by weight of the proton-conductive copolymer. If the amount of the cross-linked polymer is less than about 1 part by weight, there may be no detectable change in the properties. If the amount of the cross-linked polymer is more than about 50 parts by weight, the resulting polymer electrolyte membrane may lack the features of a block copolymer exhibited by the proton-conductive copolymer.

The polymer electrolyte membrane obtained as described above can be used as an electrolyte membrane for a fuel cell. A fuel cell, according to exemplary embodiments of the present invention, includes a cathode, an anode, and a polymer electrolyte membrane interposed between the cathode and the anode.

The cathode and the anode each consist of a gas diffusion layer and a catalyst layer. The catalyst layer contains a metal catalyst, which catalytically aids in related reactions (oxidation of hydrogen and reduction of oxygen), and may contain at least one catalyst selected from platinum, ruthenium, osmium, a platinum-osmium alloy, a platinum-palladium alloy, and a platinum-M alloy, wherein M is at least one transition metal selected from gadolinium (Ga), titanium (Ti), vanadium (V), chromium (Cr), manganese (Mn), iron (Fe), cobalt (Co), nickel (Ni), copper (Cu) and zinc (Zn). The catalyst layer may contain, among these, for example, at least one catalyst selected from platinum, ruthenium, osmium, a platinum-ruthenium alloy, a platinum-osmium alloy, a platinum-palladium alloy, a platinum-cobalt alloy, and a platinum-nickel alloy.

The metal catalyst may be supported on a support. The support can be carbon, such as, acetylene black or graphite, or inorganic micro-particles formed of alumina, silica, or the like. In the case of using a catalyst formed of a noble metal supported on a support, commercially available catalysts may be used, or a catalyst may be prepared by supporting a noble metal on a support.

For the gas diffusion layer, carbon paper or carbon cloth may be used, but the aspects of the present invention are not limited thereto. The gas diffusion layer plays a role of supporting the electrodes of a fuel cell, and also a role of diffusing the reactant gases into the catalyst layer, so that the reactant gases can easily approach the catalyst layer. For this gas diffusion layer, A product obtained by treating carbon paper or carbon cloth to be water-repellent, using a fluorine-based resin such as polytetrafluoroethylene, may be used to prevent the gas diffusion efficiency from deteriorating, due to the water generated during the operation of the fuel cell.

The electrodes may respectively further include a micro-porous layer between the gas diffusion layer and the catalyst layer, to further enhance the gas diffusion effect of the gas diffusion layer. The micro-porous layer may be formed by applying a composition containing a conductive material, such as, carbon powder, carbon black, activated carbon, acetylene black, or the like, a binder such as polytetrafluoroethylene, and an ionomer, if necessary, between the gas diffusion layer and the catalyst layer.

According to an exemplary embodiment of the present invention, the fuel cell is a direct methanol fuel cell. Hereinafter, a direct methanol fuel cell 20 will be described by making reference to FIG. 2.

Figure 2:
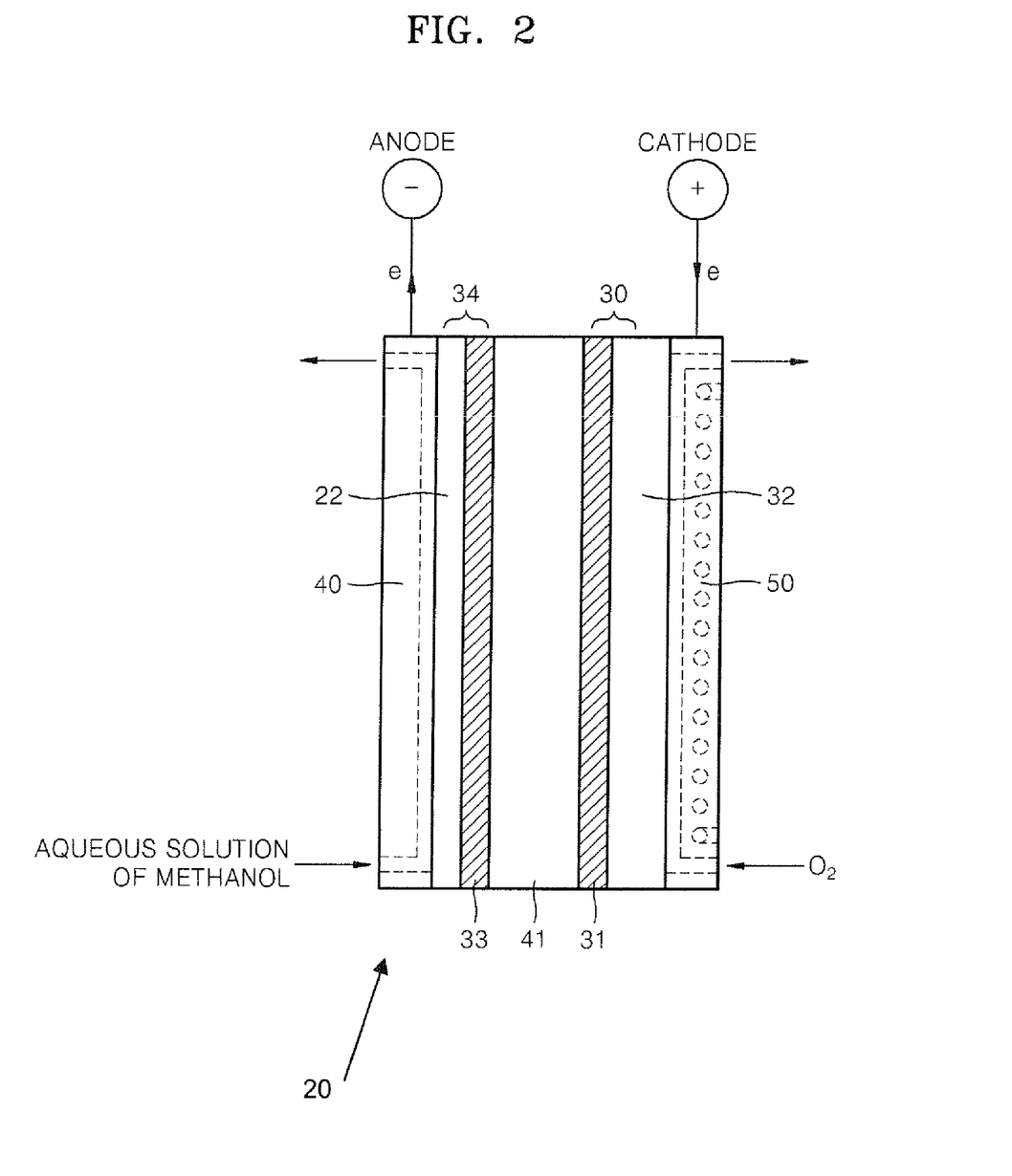
FIG. 2 is a diagram schematically illustrating the configuration of a direct methanol fuel cell, according to an exemplary embodiment of the present invention.

The direct methanol fuel cell (DMFC) 20 has a structure as shown in FIG. 2. Referring to FIG. 2, the DMFC 20 comprises an anode 34 to which fuel is supplied, a cathode 30 to which an oxidant is supplied, and an electrolyte membrane 41 which is disposed between the anode 34 and the cathode 30. In general, the anode 34 consists of an anode diffusion layer 22 and an anode catalyst layer 33. The cathode 30 consists of a cathode diffusion layer 32 and a cathode catalyst layer 31.

An aqueous solution of methanol is transferred to the anode catalyst layer 33, through the anode diffusion layer 22, and then is decomposed to electrons, protons, carbon dioxide, and the like. The protons are transferred to the cathode catalyst layer 31, through the electrolyte membrane 41, the electrons are transferred to an external circuit, and carbon dioxide is discharged to the outside. At the cathode catalyst layer 31, the protons transferred through the electrolyte membrane 41, the electrons supplied from an external circuit, and oxygen transferred from the air through the cathode diffusion layer 32, react to produce water.

EXAMPLES

Hereinafter, the present invention will be described in more detail by way of the following Examples, but the aspects of the present invention are not intended to be limited thereto.

Synthesis Example 1

Production of Proton-Conductive Block Copolymer

In a nitrogen atmosphere, 2 g of the styrene-dimethylsiloxane block copolymer of Formula (5) (wherein m is 0.7; r is 0.3; and n is about 170; the weight average molecular weight is 159,000) was added to 20 g of dichloroethane, and the mixture was refluxed at 50° C.

Acetic anhydride and 98 wt % sulfuric acid were mixed, at a mixing ratio by mole of 2:1, to yield acetyl sulfate.

0.8 g of the acetyl sulfate was added drop-wise to the reflux mixture, and the resultant mixture was refluxed at 60° C. for 3 hours. Then, 2-propanol was added to terminate the reaction, and the solvent was removed from the reaction mixture by evaporation. The residual product was washed with water and methanol, to obtain a proton-conductive block copolymer represented by the Formula (4) above (p=0.22, q=0.48, r=0.3 and n=170).

Example 1

Production of Polymer Electrolyte Membrane 1 g of the proton-conductive block copolymer of Formula (4) (p=0.22, q=0.48, r=0.3 and n=170) obtained in the Synthesis Example 1 was dissolved in 20 g of tetrahydrofuran, and the mixture was stirred to obtain a solution A.

Apart from this, 1 g of a siloxane oligomer represented by Formula 7 (m=about 200) and 0.1 g of a cross-linking agent represented by Formula II (k=about 192, t=about 8) were dissolved in 20 g of tetrahydrofuran, to obtain a solution B.

The solution A and the solution B were mixed, at a mixing ratio by weight of 19:1, to yield a composition C.

The composition C was placed on a glass dish and left to stand at 20° C., for 4 hours under a nitrogen stream (0.1 liter/min), to form a film, and the film and the glass dish were heated at 70° C. for 12 hours to induce a cross-linking reaction between the siloxane oligomer and the cross-linking agent. Thus, a polymer electrolyte membrane comprising the proton-conductive block copolymer of the Formula (4), a cross-linking reaction product of the siloxane oligomer of the Formula (7), and the cross-linking agent of the Formula (11), was formed to a thickness of 37 μm.

Example 2

Production of Polymer Electrolyte Membrane

A polymer electrolyte membrane was formed, according to the same method as in Example 1, except that the solution A and the solution B were mixed at a mixing ratio by weight of 9:1, to obtain a composition D.

Reference Example 1

Production of polymer electrolyte membrane 1 g of the proton-conductive block copolymer, obtained according to the Synthesis Example 1 (degree of sulfonation: 31%, weight average molecular weight: 169,000 g/mol, amount of PDMS contained: 30% by weight), was dissolved in 20 g of tetrahydrofuran, and the resulting mixture was stirred to yield a solution A.

A polymer electrolyte membrane was produced, according to the same method as in Example 1, except that the solution A was placed on a glass dish and left to stand at 20° C., for 4 hours in a nitrogen atmosphere, to form a polymer electrolyte membrane (film) having a thickness of 27 μm. Unlike Example 1, neither a siloxane oligomer nor a cross-linking agent was used in Reference Example 1.

Comparative Example 1

Bisphenol-A (20 mmol), dichlorodiphenylsulfone (8 mmol), sulfonated dichlorodiphenylsulfone (12 mmol), and potassium carbonate (50 mmol) were allowed to react in a mixed solvent comprising 70 mL of N-methylpyrrolidone and 40 mL of toluene, at 150° C., while removing water from the reaction system. The reaction mixture was heated at 180° C., and polymerization was performed for 24 hours.

After completing the polymerization reaction, the reaction product was precipitated in 2-propanol, and then washed with distilled water to eliminate any water-soluble byproducts. The resultant product was dissolved in N,N-dimethylacetamide, to a concentration of 40% by weight, and a film was formed from the solution using a doctor blade. The film thus formed was heated at 80° C., to remove the solvent, and a polymer electrolyte membrane formed of polysulfone having a thickness of 200 μm was obtained.

Comparative Example 2

A NAFION 115 membrane purchased from DuPont Corporation was used.

The polymer electrolyte membranes produced according to Examples 1 and 2, Reference Example 1, and Comparative Examples 1 and 2 were tested for tensile strength, toughness, and methanol permeability, in a dry membrane state. The polymer electrolyte membranes were then immersed in distilled water for 24 hours, and were tested for ion conductivity and moisture content. The results are presented in Table 1 below.

TABLE 1

| Class | Total amount of siloxane oligomer and cross-linking agent for forming cross-linked polymer (parts by weight) | Thickness of polymer electrolyte membrane (μm) | Moisture content (wt %) | Tensile strength (N/mm$^2$) | Toughness (kJ/m$^2$) | Methanol crossover (10$^{-7}$ cm/s) | Ion conductivity (S/cm$^2$) |
|---|---|---|---|---|---|---|---|
| Ref. Ex. 1 | 0 | 27 | 8.4 | 12.6 | 1.1 | 2.39 | 5.3 |
| Ex. 1 | 5 | 37 | 6.8 | 17.8 | 2.8 | 2.06 | 5.5 |
| Ex. 2 | 10 | 56 | 5.7 | 19.4 | 5.1 | — | 5.9 |
| Comp. Ex. 1 | 0 | 200 | — | 0.47 | 0.2 | 2.6 | 4.5 |
| Comp. Ex. 2 | 0 | 150 | 27 | 26.7 | — | 26 | 6.0 |

In the Table 1 above, the tensile strength was measured in a dry membrane state, and the moisture content was determined by the equation:

Moisture Content=(Mass$_{wet}$−Mass$_{dry}$)/Mass$_{dry}$;

wherein Mass$_{dry}$ represents the weight of the polymer electrolyte membrane obtained after immersing the polymer electrolyte membrane in distilled water for 24 hours; and Mass$_{dry}$ represents the weight of the polymer electrolyte membrane in a dry state. The methanol permeability was measured at room temperature, and the ion conductivity was measured at 30° C., after immersing the polymer electrolyte membrane in distilled water for 24 hours, using a four-point method.

As shown in Table 1 above, the polymer electrolyte membranes of Examples 1 and 2 showed excellent ion conductivities, as compared to that of Reference Example 1, and showed reduced moisture contents, as compared to that of Reference Example 1. From these results, it can be seen that the polymer electrolyte membranes of Examples 1 and 2 had improved mechanical properties, while maintaining proton paths.

Figure 3:
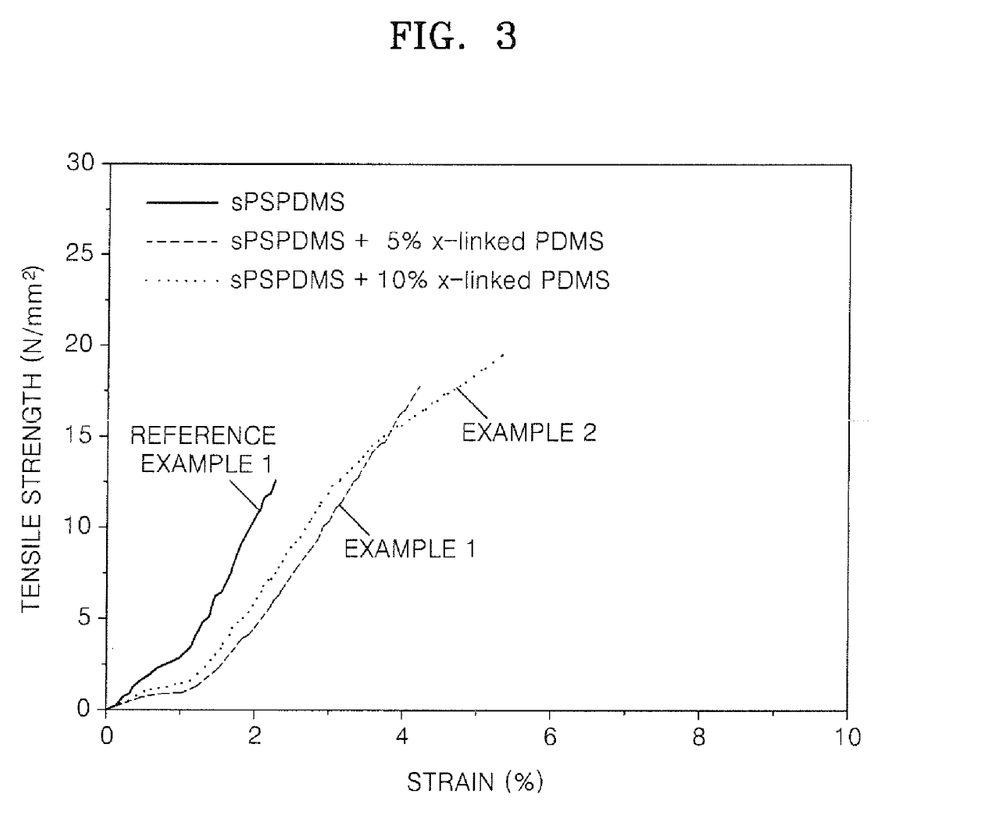
FIG. 3 is a graph showing tensile strength properties of the polymer electrolytic membranes obtained according to Examples 1 and 2, and Reference Example 1 of the present invention.

The tensile strengths of the polymer electrolyte membranes of Reference 1 and Examples 1 and 2, given in the Table 1, are presented in the graph shown in FIG. 3. Referring to FIG. 3, it can be seen that the tensile strength has been improved in the polymer electrolyte membranes of Examples 1 and 2, as compared to Reference Example 1.

Figure 4:
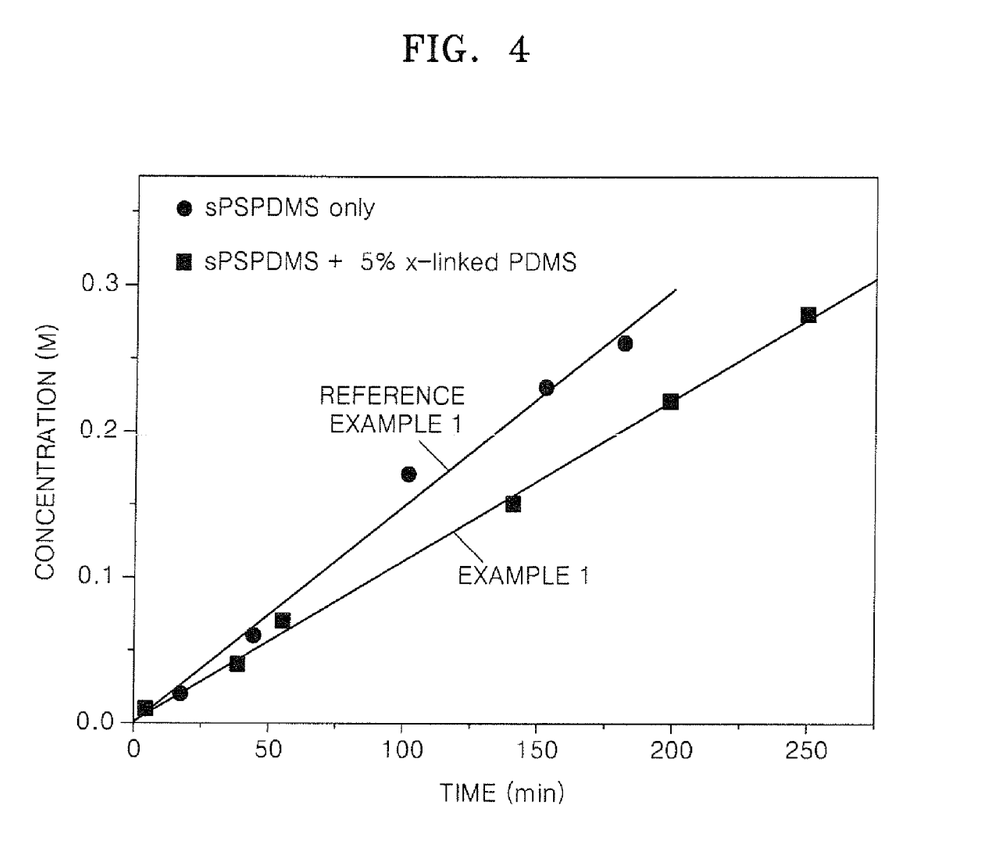
FIG. 4 is a graph showing the methanol permeability property of the polymer electrolytic membranes obtained according to Example 1 and Reference Example 1 of the present invention.

The methanol permeability of the polymer electrolyte membranes of Reference Example 1 and Example 1, given in the Table 1, are presented in the graph shown in FIG. 4. This methanol permeability was measured using a diffusion cell method, by placing a polymer electrolyte membrane between two cells (35 mL each) filled with water and a 3M aqueous solution of methanol, respectively. Changes in the concentration of the methanol solution were measured with respect to time. Referring to FIG. 4, it can be seen that the polymer electrolyte membrane of Example 1 had a reduced methanol permeability, as compared to that of Reference Example 1.

Example 3

Production of Unit Fuel Cell

A unit fuel cell was produced using two electrodes and a polymer electrolyte membrane. The polymer electrolyte membrane produced in Example 1 was used as the polymer electrolyte membrane, and electrodes were each loaded with 10 mg/cm$^2$ of PtRu and Pt catalysts and were used as the cathode and the anode, respectively.

Example 4

Production of Unit Fuel Cell

A unit fuel cell was produced according to the same method as in Example 3, except that the polymer electrolyte membrane of Sample No. 5 was used instead of the polymer electrolyte membrane of Example 1.

Comparative Example 3

A unit fuel cell was produced according to the same method as in Example 3, except that the polymer electrolyte membrane of Comparative Example 1 was used instead of the polymer electrolyte membrane of Example 1.

Comparative Example 4

A unit fuel cell was produced according to the same method as in Example 3, except that a NAFION 115 membrane was used instead of the polymer electrolyte membrane of Example 1.

For the unit fuel cells produced in Examples 3 and 4 and Comparative Examples 3 and 4, the voltage characteristics and changes in the power density, in accordance with the current density, were examined. The voltage and power density characteristics of the unit fuel cells of Examples 3 and 4 were improved, as compared to the unit fuel cells of Reference Examples 3 and 4.

The proton-conductive, copolymer-containing composition, according to aspects of the present invention, contains a proton-conductive copolymer and a cross-linked polymer, obtained as a product of a cross-linking reaction between a siloxane oligomer and a cross-linking agent, and thus, has excellent chemical and mechanical properties. The dimethylsiloxane repeating unit, contained in the proton-conductive copolymer, imparts an excellent film formability and a low methanol permeability to the composition. The styrene repeating units, having a proton-conductive functional group, contained in the proton-conductive copolymer impart excellent ion conductivity. The cross-linked polymer has the same properties as those of the dimethylsiloxane repeating unit of the proton-conductive copolymer.

By using the proton-conductive, copolymer-containing composition, a polymer electrolyte membrane having excellent ion conductivity and improved mechanical properties, such as, toughness and tensile strength, can be obtained. Therefore, a fuel cell having an improved performance in, for example, polymer efficiency can be produced using the polymer electrolyte membrane.

Although a few embodiments of the present invention have been shown and described, it would be appreciated by those skilled in the art that changes may be made in this embodiment without departing from the principles and spirit of the invention, the scope of which is defined in the claim and their equivalents.

What is claimed is:

1. A composition comprising:
   a proton-conductive copolymer comprising a repeating unit represented by the following Formula (1), a repeating unit represented by the following Formula (2), and a repeating unit represented by the following Formula (3); and
   a cross-linked polymer obtained from a cross-linking reaction between a siloxane oligomer having an unsaturated bond and a cross-linking agent:

[Formula 1]

wherein R$_1$ and R$_2$ are each independently selected from hydrogen, a halogen atom, or a halogenated C$_1$-C$_{10}$ alkyl group, and p represents a molar amount ranging from 0.1 to 0.9;

[Formula 2]

wherein $R_3$ and $R_4$ are each independently selected from hydrogen, a halogen atom, or a halogenated $C_1$-$C_{10}$ alkyl group, $R_5$ represents —$SO_3H$, —$PO_3H$, or —$CO_2H$, and q represents a molar amount ranging from 0.1 to 0.9;

[Formula 3]

wherein $R_6$ represents a $C_1$-$C_{10}$ alkyl group; and r represents a molar amount ranging from 0.1 to 0.9.

2. The composition of claim 1, wherein the proton-conductive copolymer is represented by the following Formula (4):

[Formula 4]

wherein p, q, and r are each independently selected from a molar amount ranging from 0.1 to 0.9; and n is a number ranging from 1 to 100,000.

3. The composition of claim 1, wherein the siloxane oligomer having an unsaturated bond is a compound represented by the following Formula (6):

[Formula 6]

wherein $R_7$ and $R_8$ are each independently selected from a $C_1$-$C_{20}$ alkyl group, a $C_1$-$C_{20}$ alkoxy group, or a halogen atom, wherein at least one of $R_9$ and $R_{10}$ represents a vinyl group, a $C_3$-$C_{20}$ vinylalkyl group, or a $C_7$-$C_{20}$ vinylaryl group, while the other one of $R_9$ and $R_{10}$ represents a $C_1$-$C_{20}$ alkyl group, a $C_1$-$C_{20}$ alkoxy group, or a halogen atom, and wherein m is a number ranging from 1 to 1000.

4. The composition of claim 3, wherein the compound represented by the Formula (6) is one selected from the group consisting of a compound represented by the following Formula (7), a compound represented by the following Formula (8), and a compound represented by the following Formula (9):

[Formula 7]

wherein m is a number ranging from 1 to 1000;

[Formula 8]

wherein m is a number ranging from 1 to 1000; and

[Formula 9]

wherein m is a number ranging from 1 to 1000.

5. The composition of claim 1, wherein the cross-linking agent is a compound represented by the following Formula (10):

[Formula 10]

wherein $R_{11}$, $R_{12}$, $R_{13}$ and $R_{14}$ each independently represent a $C_1$-$C_{20}$ alkyl group, a $C_1$-$C_{20}$ alkoxy group, or a halogen atom; k is a number ranging from 1 to 1000; and t is a number ranging from 1 to 1000.

6. The composition of claim 5, wherein the compound represented by the Formula (10) is a compound represented by the following Formula (11);

[Formula 11]

wherein k is a number from 1 to 1000; and t is a number from 1 to 1000.

7. The composition of claim 1, wherein the amount of the cross-linked polymer contained in the composition ranges from 1 to 50 parts by weight, based on 100 parts by weight of the proton-conductive copolymer.

8. The composition of claim 1, wherein the degree of polymerization of the proton-conductive copolymer ranges from 1 to 100,000.

9. The composition of claim 1, wherein the weight average molecular weight of the proton-conductive copolymer ranges from 500 to 5,000,000.

10. The compound of claim 1, wherein the cross-linked polymer is entangled in, but not covalently bonded to, the repeating unit represented by Formula 3.

11. A polymer electrolyte membrane containing a composition comprising:
   a proton-conductive copolymer comprising a repeating unit represented by the following Formula (I), a repeating unit represented by the following Formula (2), and a repeating unit represented by the following Formula (3); and
   a cross-linked polymer obtained from a cross-linking reaction between a siloxane oligomer having an unsaturated bond and a cross-linking agent:

[Formula 1]

wherein $R_1$ and $R_2$ are each independently selected from hydrogen, a halogen atom, or a halogenated $C_1$-$C_{10}$ alkyl group, and p represents a molar amount ranging from 0.1 to 0.9;

[Formula 2]

wherein $R_3$ and $R_4$ are each independently selected from hydrogen, a halogen atom, or a halogenated $C_1$-$C_{10}$ alkyl group, $R_5$ represents —$SO_3H$, —$PO_3H$, or —$CO_2H$, and q represents a molar amount ranging from 0.1 to 0.9;

[Formula 2]

wherein $R_6$ represents a $C_1$-$C_{10}$ alkyl group; and r represents a molar amount ranging from 0.1 to 0.9.

12. A fuel cell employing the polymer electrolyte membrane of claim 11.

13. The polymer electrolyte membrane of claim 11, wherein the proton-conductive copolymer is represented by the following Formula (4):

[Formula 4]

wherein p, q, and r are each independently selected from a molar amount ranging from 0.1 to 0.9; and n is a number ranging from 1 to 100,000.

14. The polymer electrolyte membrane of claim 11, wherein the siloxane oligomer having an unsaturated bond is a compound represented by the following Formula (6):

[Formula 6]

wherein $R_7$ and $R_6$ are each independently selected from a $C_1$-$C_{20}$ alkyl group, a $C_1$-$C_{20}$ alkoxy group, or a halogen atom, wherein at least one of $R_9$ and $R_{10}$ represents a vinyl group, a $C_3$-$C_{20}$ vinylalkyl group, or a $C_7$-$C_{20}$ vinylaryl group, while the other one of $R_9$ and $R_{10}$ represents a $C_1$-$C_{20}$ alkyl group, a $C_1$-$C_{20}$ alkoxy group, or a halogen atom, and wherein m is a number ranging from 1 to 1000.

15. The polymer electrolyte membrane of claim 14, wherein the compound represented by the Formula (6) is one selected from the group consisting of a compound represented by the following Formula (7), a compound represented by the following Formula (8), and a compound represented by the following Formula (9):

[Formula 7]

wherein m is a number ranging from 1 to 1000;

[Formula 8]

wherein m is a number ranging from I to 1000; and

[Formula 9]

wherein m is a number ranging from 1 to 1000.

16. The polymer electrolyte membrane of claim 11, wherein the cross-linking agent is a compound represented by the following Formula (10):

[Formula 10]

wherein $R_{11}$, $R_{12}$, $R_{13}$, and $R_{14}$ each independently represent a $C_1$-$C_{20}$ alkyl group, a $C_1$-$C_{20}$ alkoxy group, or a halogen atom; k is a number ranging from 1 to 1000; and t is a number ranging from 1 to 1000.

17. The polymer electrolyte membrane of claim 16, wherein the compound represented by the Formula (10) is a compound represented by the following Formula (11):

[Formula 11]

wherein k is a number from 1 to 1000, and is a number from 1 to 1000.

18. The polymer electrolyte membrane of claim 11, wherein the amount of the cross-linked polymer contained in the composition ranges from 1 to 50 parts by weight, based on 100 parts by weight of the proton-conductive copolymer.

19. The polymer electrolyte membrane of claim 11, wherein the degree of polymerization of the proton-conductive copolymer ranges from 1 to 100,000.

20. The polymer electrolyte membrane of claim 11, wherein the weight average molecular weight of the proton-conductive copolymer ranges from 500 to 500,000.

* * * * *

UNITED STATES PATENT AND TRADEMARK OFFICE
CERTIFICATE OF CORRECTION

PATENT NO. : 7,619,044 B2
APPLICATION NO. : 11/857063
DATED : November 17, 2009
INVENTOR(S) : Won-mok Lee et al.

Page 1 of 1

It is certified that error appears in the above-identified patent and that said Letters Patent is hereby corrected as shown below:

Column 19, lines 55-65, replace "[Formula 2]

,"

with --[Formula 3]

,--.

Column 20, line 33, change "$R_6$" to --$R_8$--.

Column 21, line 1, change "Ito" to --1 to--.

Column 22, line 25, change "500,000" to --5,000,000--.

Signed and Sealed this

Sixteenth Day of February, 2010

David J. Kappos
*Director of the United States Patent and Trademark Office*